United States Patent [19]

Fetter

[11] 4,015,257
[45] Mar. 29, 1977

[54] RADAR DETECTION OF TURBULENCE IN PRECIPITATION

[75] Inventor: Richard W. Fetter, Warrenville, Ill.

[73] Assignee: The United States of America as represented by the Secretary of the Navy, Washington, D.C.

[22] Filed: Sept. 11, 1975

[21] Appl. No.: 612,384

[52] U.S. Cl. .............................. 343/5 W; 343/5 SA; 356/103

[51] Int. Cl.² ........................................ G01S 9/60

[58] Field of Search .......... 343/5 W, 5 SA; 356/28, 356/103

[56] References Cited

UNITED STATES PATENTS

| | | | |
|---|---|---|---|
| 3,447,153 | 5/1969 | Maguire | 343/5 W |
| 3,573,824 | 4/1971 | Armstrong | 343/5 W |
| 3,795,912 | 3/1974 | Pierce et al. | 343/5 SA |
| 3,803,601 | 4/1974 | Serafin | 343/5 W |

Primary Examiner—T.H. Tubbesing
Assistant Examiner—S. C. Buczinski
Attorney, Agent, or Firm—Richard S. Sciascia; George A. Montanye

[57] ABSTRACT

A technique for processing the IF portion of a radar return signal in order to provide the remote detection and measurement of atmospheric turbulence occurring within precipitation. The technique employs an amplitude limiter, a wideband discriminator and a video amplifier to provide real time measurement of the precipitation velocity. A velocity comparison at various radar ranges is made to provide an indication of the turbulence. The analog circuit employed to make this measurement operates with high speed and is capable of being used with any pulsed (coherent or non-coherent) weather radar.

4 Claims, 2 Drawing Figures

RADAR DETECTION OF TURBULENCE IN PRECIPITATION

The invention described herein may be manufactured and used by or for the Government of the United States of America for governmmental purposes without the payment of any royalties thereon or therefor.

BACKGROUND OF THE INVENTION

This application is related to my co-pending application entitled "Real Time Analog Doppler Processor for Weather Radar," Ser. No. 612,385, having the same filing date as this application.

This invention relates to the detection and measurement of atmospheric turbulence and in particular to an analog technique for processing and using the information obtained from small Doppler shifts in the frequency of pulsed radar return signals from precipitation targets to provide an indication of turbulence.

The detection and measurement of atmospheric turbulence has application in meteorology and aviation. In the field of meteorology the study of turbulence and its associated effect on general weather conditions leads to a more accurate and complete form of weather patterns. More importantly, however, the study of atmospheric turbulence is of great concern in the field of aviation because aircraft must be properly apprised of and avoid any hazardous turbulence. Although clear air turbulence is often difficult to measure, reflected radar returns from rain, snow, hail and ice are now capable of providing an indication of the turbulence in general location of such precipitation in accordance with the teachings of this invention. Moreover, if the radar is sensitive enough to detect the refractive index gradients in clear air turbulence, the technology presented herein is also capable of detection of such turbulence even though precipitation is not present.

The pulsed radar return from precipitation targets are in the nature of a complex waveform having rapid fluctuation in amplitude and phase. The fluctuation rates are usually limited only by the pulse width or the bandwidth of the receiver. The complex nature of the signal represents the vector summation of the simultaneous returns from the plurality of scatters in the radar pulse volume. The size, spatial position and velocity of the precipitation relative to the radar contributes to the nature of the received signal. This affects the instantaneous and average intensity and mean frequency as well as the statistical properties of these parameters. Doppler radar in conjunction with the real analogue Doppler processor of my co-pending application provide for a suitable technique for measuring relative motion between precipitation targets and the source of radar. As stated in my co-pending application, the velocity of this precipitation is an indirect measurement of the movement of the winds. I have devised a simple method of obtaining turbulence information from the velocity measurement.

Until now there have been significant drawbacks for the use of Doppler radar to provide turbulence information. Among them are the difficulty in making quick and accurate velocity measurements. For example, methods of the prior art require measurements to be made on a large number of samples to be taken of the return signal at each radar range to acquire velocity information. Such techniques use various circuits to provide a sinusoidal estimate of the mean Doppler frequency which is indicative of the precipitation velocity. To obtain this desired result covering many ranges, large scale digital computers or complex data processors capable of storing many samples are employed and then are used to perform a complex mathematical analysis of the values to obtain velocity dependent characteristics. This must be done for each range and as a result the number of calculations is large. Moreover, since turbulence may be viewed as a first derivative of the velocity, the processing circuits must be capable of changing the velocity information into turbulence information. Because of the complexity and difficulty of obtaining velocity information, turbulence detection has often been slow, and any acquired data has been usually meaningless in a fast moving storm situation.

Considering the above drawbacks to the prior art, I have devised a method of providing an instantaneous measurement and remote detection of atmospheric turbulence within precipitation using radar.

It is therefore an object of this invention to provide a simple discrete system for the instantaneous and continuous measurement of turbulence.

Another object of this invention is to provide a simple delay line circuit in conjunction with a real time analog Doppler processor to provide turbulence information at a given radar range.

And yet a further object of this invention is to provide a warning system for aircraft so that turbulence exceeding a preset level at wavelengths critical to the aircraft is quickly relayed to the pilot.

And yet another object of this invention is to provide a turbulence detection system which is capable of adjustment so that one may select turbulence wavelengths.

Still a further object of this invention is to provide a turbulence measurement with high speed that is useful with a rapid scanning antenna and in such rapidly changing meteorological situations as high speed jet aircraft.

Other objects, advantages and novel features of the invention will become apparent from the following detailed description of the invention when considered in conjunction with the accompanying drawings wherein.

SUMMARY OF THE INVENTION

The measurement and detection of atmospheric turbulence can be effected by the detection of the return signal from two successive pulse volumes scanned by the radar beam and by the measurement of the average power and the fluctuation of the frequency spectrum of the received signals from the successive volumes. For example, the standard deviation of the Gaussian shaped spectrum resulting from rain or other precipitation is directly proportional to the degree of turbulence; that is to say the larger the standard deviation the greater the turbulence. Also the amplitude of the Gaussian shaped spectrum is indicative of the amount of precipitation in the pulsed volume. A successive gating of the radar receiver provides a signal representative of the successive spatial volume under consideration at a particular time along the beam. When the mean velocity of the radar return at two successive pulsed volumes differ, the characteristics of the resulting frequency spectrum is a measurement of the intensity of turbulence in traversing the distance between the two successive spatial volumes. An amplitude limiter, a wideband discriminator and a video amplifier are coupled to the radar IF to provide a device capable of making real time velocity measurements. The real time velocity measurements are then processed thru the appropriate delay line in order to measure turbulence and its intensity a various radar ranges.

DETAILED DESCRIPTION

Figure 1:
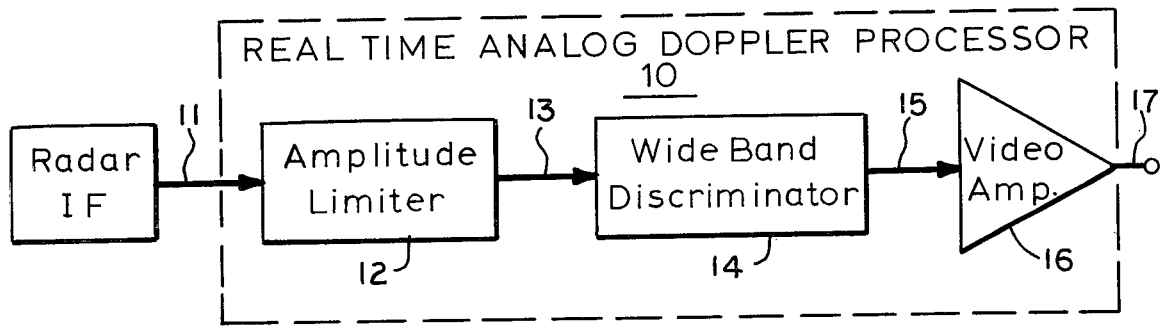
FIG. 1 is a block diagram of a typical system capable of providing the technique of making instantaneous velocity measurements of small Doppler shifts.
Figure 2:
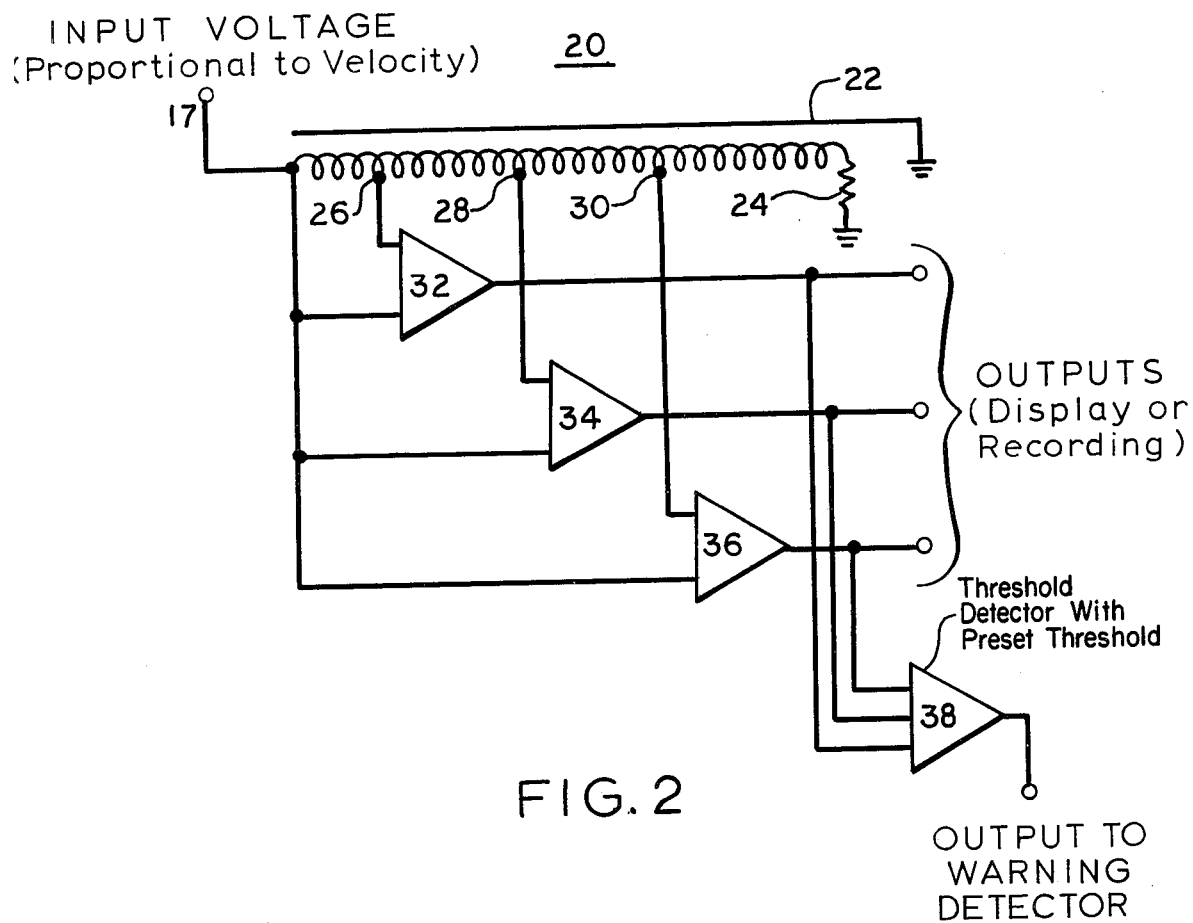
FIG. 2 is a diagram of the turbulence detection system.

The real time analog processor (RANDOP) is shown in FIG. 1. The circuit 10 accepts the radar IF signal and produces a voltage output proportional to the instantaneous frequency of the received signal or the instantaneous value of the complex velocity spectrum as stated in my copending application entitled "Real Time Analog Doppler Process for Weather Radar", Ser. No. 612,385. This voltage represents precipitation velocity relative to the radar as a function of range. IF from the radar is provided to amplitude limiter 12 by line 11. The signal is then provided to wideband discriminator 14 by line 13. The output of the discriminator is fed to a video amplifier 16 on line 15. A voltage proportional to the velocity of the precipitation target is provided to turbulence detection circuit 20 as shown in FIG. 2.

The velocity signal obtained from the circuit of FIG. 1 or any other available velocity processor is delayed by delay line 22 for various times corresponding to range dimensions (i.e. scale of expected turbulence wavelength). As shown in FIG. 2, the delay line 22 and its associated resistor 24 provide a means for selectively delaying the velocity signal. That is to say the location of tap 26 corresponds to a delay of $d_1$, tap 28 corresponds to a delay of $d_2$, which delay is greater than $d_1$. Similarly tap 30 provides a delay of $d_n$. It should be understood that the various taps are moveable and their selection depends upon the turbulence wavelength of concern. The difference amplifier 32 measures the difference in amplitude between the delayed signal on line 26 (delayed by time $d_1$) and the reference velocity signal on line 17. The difference amplifier 34 amplifies the amplitude difference between the velocity signal on line 17 and the signal delayed by time $d_2$ from tap 28. Amplifier 36 which is coupled to tap 30, amplifies the difference between the velocity signal and the signal delayed by time $d_n$. Each one of these delays corresponds to a time proportional to the spatial range of different turbulence wavelengths. Specifically, when the delayed signals are compared with the undelayed velocity signal only the velocity difference of that scale (or integral sub-multiples of that scale) will be produced at each output for display, threshold detection or recording. The output of the difference amplifiers 32, 34, 36 represent the selected critical wavelengths of turbulence which affect the particular aircraft. These signals can be applied to the threshold detector 38 to provide an alarm to the pilot when the selected turbulence wavelength reaches a preset and undesirable level.

The primary advantage of this invention is that aircraft turbulence warnings are enhanced since the invention does not depend upon the radar pulse repetition frequency and does not require a coherent radar. By the selection of the appropriate time delay corresponding to the aerodynamics of the particular aircraft, the system presented herein is capable of detecting and giving advance warning to pilots of turbulence ahead. The circuit is not only faster than the prior art but is much less complex leading to a lighter, smaller and more reliable system.

Obviously many modifications and variations of the present invention are possible in the light of the above teachings. It is therefore to be understood that within the scope of the appended claims the invention may be practiced otherwise than as specifically described.

I claim:

1. A method of detecting turbulence within precipitation using an IF portion of a radar system wherein the IF portion has a center frequency comprising:
   applying the IF portion of the radar system to a discriminator for detecting frequency variations from the center frequency, which variations are indicative of the velocity of the precipitation;
   producing a voltage proportional to said detected frequency variations;
   splitting the voltage proportional to the detected frequency variations into a first and second part;
   applying said first part to a delay line;
   comparing said second part to the delayed first part;
   amplifying any amplitude difference between the compared parts to provide a voltage indication of turbulence at a particular range.

2. The method as described in claim 1 further comprising:
   detecting any voltage indicative of turbulence at a particular range having an amplitude greater than a preset level.

3. A method of detecting turbulence within precipitation using an IF portion of a radar system wherein the IF portion has a center frequency comprising:
   applying the IF portion of the radar system to a discriminator for detecting frequency variations from the center frequency, which variations are indicative of the velocity of the precipitation;
   producing a voltage proportional to said detected frequency variations;
   splitting the voltage proportional to the detected frequency variations into a first and second part;
   applying said first part to a delay line having a delay time of $d_1$, wherein $d_t$ is a time proportional to a turbulence having a wavelength corresponding to $L_1$;
   comparing said second part to the delayed first part;
   amplifying any amplitude difference between the compared parts to provide a first voltage indicative of the turbulence having a wavelength corresponding to $d_1$;
   applying said delayed first part to a delay line having a further delay time of $d_n$;
   comparing said second part to said further delayed first part;
   amplifying any amplitude difference between the compared second and further delayed parts to provide a voltage indicative of the turbulence having a wavelength corresponding to $d_n$.

4. The method as described in claim 3 further comprising:
   detecting any voltage indicative of turbulence at a particular range having an amplitude greater than a preset level.

* * * * *